United States Patent [19]

Chesson et al.

[11] Patent Number: 5,524,250
[45] Date of Patent: Jun. 4, 1996

[54] CENTRAL PROCESSING UNIT FOR PROCESSING A PLURALITY OF THREADS USING DEDICATED GENERAL PURPOSE REGISTERS AND MASQUE REGISTER FOR PROVIDING ACCESS TO THE REGISTERS

[75] Inventors: Greg Chesson, Palo Alto; In-whan Choi, Mountain View; Yuh-wen Lin, San Jose; Jeannine M. Smith, Menlo Park; Daniel Yau, Los Altos; Desmond W. Young, Campbell, all of Calif.

[73] Assignee: Silicon Graphics, Inc., Mountain View, Calif.

[21] Appl. No.: 363,599

[22] Filed: Dec. 23, 1994

Related U.S. Application Data

[63] Continuation of Ser. No. 749,156, Aug. 23, 1991, abandoned.

[51] Int. Cl.$^6$ .................................................. G06F 9/30
[52] U.S. Cl. ......................... 395/775; 395/375; 395/800; 364/231.8; 364/927.8; 364/938.4; 364/DIG. 2
[58] Field of Search ...................................... 395/375, 775, 395/800

[56] References Cited

U.S. PATENT DOCUMENTS

| | | | |
|---|---|---|---|
| 3,226,694 | 12/1965 | Wise | 364/200 |
| 4,161,024 | 7/1979 | Joyce et al. | 364/229.2 |
| 4,320,454 | 3/1982 | Suzuki et al. | 364/200 |
| 4,730,248 | 3/1988 | Watanabe et al. | 364/200 |
| 4,799,215 | 1/1989 | Suzuki | 395/325 |
| 4,959,779 | 9/1990 | Weber et al. | 364/200 |
| 4,974,157 | 11/1990 | Winfield et al. | 364/200 |
| 5,019,967 | 5/1991 | Wheeler et al. | 364/200 |
| 5,041,963 | 8/1991 | Ebersole et al. | 364/242.94 |
| 5,165,033 | 11/1992 | Kawasaki et al. | 395/775 |
| 5,203,003 | 4/1993 | Donner | 395/800 |
| 5,214,786 | 5/1993 | Watanabe et al. | 395/800 |
| 5,274,777 | 12/1993 | Kawata | 395/375 |
| 5,276,820 | 1/1994 | Ikenaga et al. | 395/375 |
| 5,305,455 | 4/1994 | Anschuetz et al. | 395/700 |
| 5,339,415 | 8/1994 | Strout, II et al. | 395/650 |

OTHER PUBLICATIONS

Peter Lawrence, "Real–Time Microcomputer System Design", 1988, pp. 483–489.
Real–Time Microcomputer System Design by Peter Lawrence, pp. 36–43, and fig 2.6, 1988.
Computer Architecture and Parallel Processing by Kai Hwang, pp. 11–12, and fig 1.5,. 1984.
IEEE Computer Society Standards Project: Draft Standard for Information Technology—Portable Operating System Interface (POSIX)–Part 1 ( System Application Program Interface–API)–Amendment 2 (Threads Extension–C Language); Oct. 1993.
Open Software Foundation: Introduction to DCE, Revision 1.0; Nov. 8, 1991.
Accetta, M. et al., "Mach: A New Kernel Foundation for UNIX Development", Proceedings of the Summer 1986 USENIX Conference, Jun. 1986, pp. 93–112.
Tevanian, A Jr. et al., "Mach Threads and the Unix Kernel: The Battle for Control", Proceedings of the Summer 1987 USENIX Conference, Jun. 1987, pp. 185–197.

*Primary Examiner*—Thomas C. Lee
*Assistant Examiner*—Moustafa Mohamed Meky
*Attorney, Agent, or Firm*—John T. McNelis

[57] ABSTRACT

A data stream processing unit comprises a CPU which comprises an ALU, a shift/extract unit, timers, a scheduler, an event system, a plurality of sets of general purpose registers, a plurality of sets of special purpose registers, masquerade registers, pipeline controller, a memory controller and a pair of internal buses. The multiple sets of general and special purpose registers improves the speed of the CPU in switching between environments. The pipeline controller, the scheduler, the events system, and the masquerade registers facilitate the implementation and execution of the methods of the present invention such as efficient thread scheduling, branch delays, elimination of delay slots after stores that provide further increases in the performance and bandwidth.

8 Claims, 11 Drawing Sheets

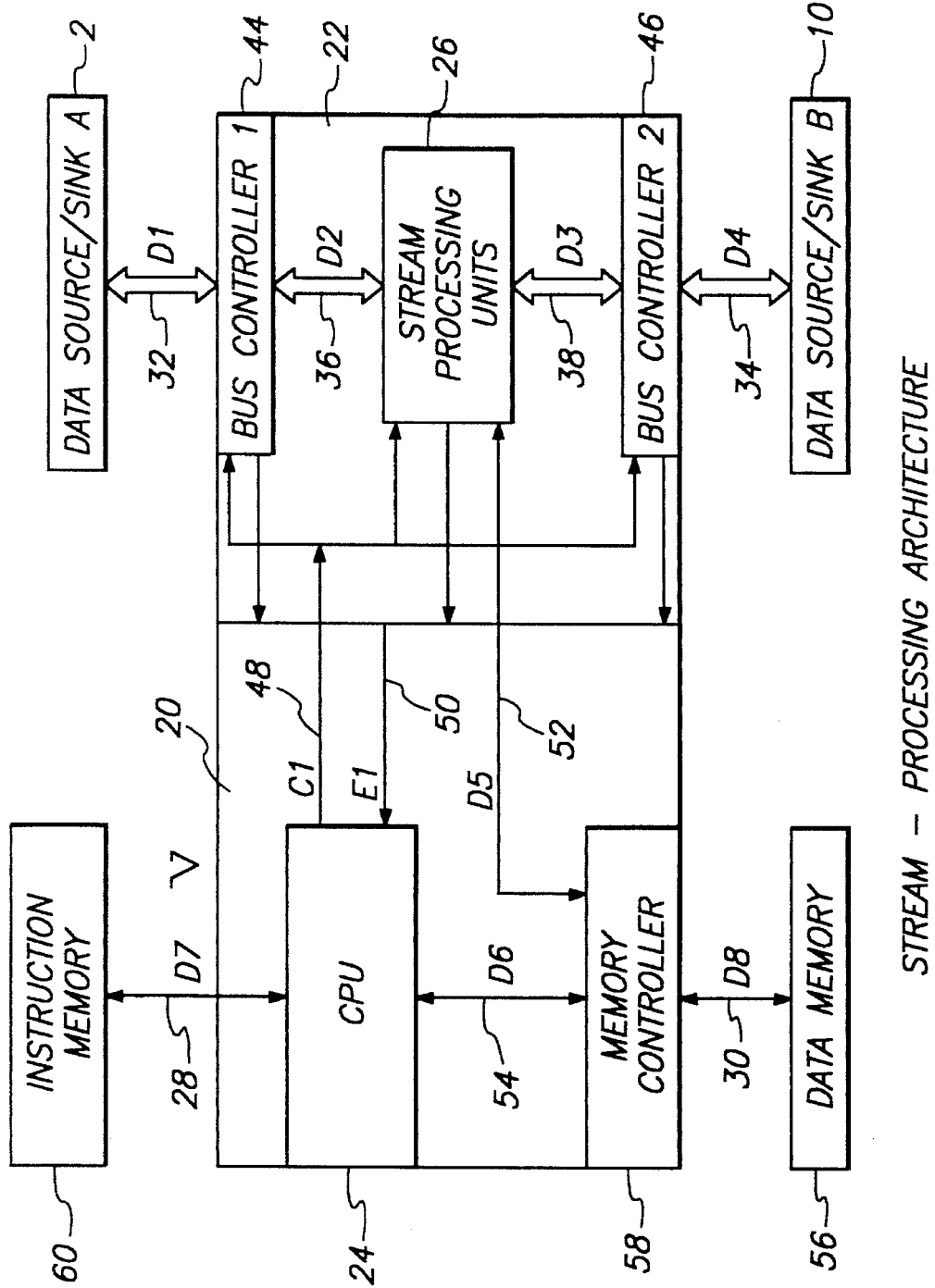
FIG. 2  STREAM – PROCESSING ARCHITECTURE

PATTERN 1: <START OF FRAME> 6 7 X X 8 9
PATTERN 2: <START OF FRAME> X X 2 3
DEFAULT: <START OF FRAME> X X X X X X

CENTRAL PROCESSING UNIT FOR PROCESSING A PLURALITY OF THREADS USING DEDICATED GENERAL PURPOSE REGISTERS AND MASQUE REGISTER FOR PROVIDING ACCESS TO THE REGISTERS

RELATED APPLICATIONS

This is a continuation of application Ser. No. 07/749,156 filed on Aug. 23, 1991, now abandoned.

BACKGROUND OF THE INVENTION

1. Field of the Invention

The present invention relates to the systems and methods for processing data, in particular, to a system and methods for improving the speed that data streams may be processed.

2. Description of Related Art

The term "data stream" or "stream" denotes the transfer of information from an information source to an information sink. The information typically spans or is contained in one or more messages commonly referred to as frames or packets.

Data streams are ubiquitous in computer systems. They exist between host processors and disk subsystems as well as other computer peripheral Input/Output systems. Data streams exist between computer systems by means of computer networks and communication systems. Data streams also exist within and between communication systems.

In the majority of cases, data within a stream is encapsulated together with additional data, called "control information" or "protocol information". This additional information serves to identify, "steer", or otherwise direct the flow of data as it is generated, transmitted or received, and processed. Protocol information is often defined by international standards such as the ISO/OSI protocol stack, CCITT recommendations for data communications and telephony, IEEE 802 standards for local area networking, and ANSI standards. Other examples include the TCP/IP protocol stack, defined by the U.S. Department of Defense, plus other military and commercial data processing standards such as the U.S. Navy SAFENET standard, the Xerox Corporation XNS protocol suite, the Sun Microsystems NFS protocol, and compression standards for HDTV and other video formats.

A computer program can implement and execute any protocol standard, in particular the ones previously mentioned. Operating systems usually include specialized software for several protocols. However, the execution of such software on a computer system consumes a percentage of its total processing capacity. This percentage can increase to precipitous, hence completely unacceptable levels, when the computer system is connected to a single very high-bandwidth data stream, or a sufficient number of lower-bandwidth data streams.

Since communication protocol processing has traditionally been performed by software programs executing on general commercial processors, there are no specialized devices and methods in the prior art suited to processing data streams.

SUMMARY OF THE INVENTION

The present invention comprises methods and apparatuses that address the problems of data stream and protocol processing. Collectively, these methods and apparatuses provide significant solutions to the several formidable challenges presented by high-performance data stream processing. In some instances, the methods and apparatuses may be used singly to achieve significant improvements in data processing speed and efficiency. In other instances, they may be used together in various combinations to achieve even greater performance improvement over the prior art. In the preferred embodiment, the present invention comprises a protocol engine having one or more modules or PORTs for processing data streams. Each of the PORTs preferably comprises a central processing unit (CPU), a memory controller, a first bus controller, a second bus controller, and a plurality of stream processing units. These components are coupled together by a plurality of buses that provide data paths between the components as well as between devices external to the protocol engine such as data sources, data sinks and memory devices. These components are also controlled by the CPU that is designed to improve data transfer rates and efficiency. The first and second bus controllers are tailored to receive and send the data in the formats of the devices to which they are coupled. The stream processing units also perform specific functions to increase the rate at which a data stream is processed. In the preferred embodiment, the stream processing units include a destination address filter, a pattern matcher, a stream parser, a copy/inset unit, a checksum unit and a data alignment unit. Thus, the present invention is able to process data streams much faster with such processing units dedicated to frequently used operations.

The present invention also includes a special bus controller for controlling a bus shared by a plurality of PORTs and memory. The bus controller of the present invention preferably includes a plurality of internal controllers, an arbiter and bus interface circuitry. The bus controller advantageously may be coupled to both DRAM and non-volatile memory thereby allowing the bus controller to be used to initialize the instruction memories of the protocol engine PORTs. The bus controller also provides for the sharing of memory between PORTs which eliminates additional data transfers between PORTs.

As noted above, the present invention also includes a PORT CPU. In the preferred embodiment, the PORT CPU comprises an ALU, a shift/extract unit, timers, a scheduler, an events system, a plurality of sets of general purpose registers, a plurality of sets of special purpose registers, masquerade registers, pipeline controller, a memory controller and a pair of internal buses. The PORT CPU advantageously provides multiple sets of general and special purpose registers for use by the bus controller and stream processing units. Thus, when the CPU switches between different environments, the CPU can switch between these multiple sets of registers and does not need to store the data in the registers. The pipeline controller, the scheduler, the events, system and the masquerade registers facilitate the implementation and execution of the methods of the present invention such as efficient thread scheduling, branch delays, elimination of delay slots after stores that provide further increases in the performance and bandwidth.

BRIEF DESCRIPTION OF THE DRAWINGS

FIG. 2 is a block diagram of the protocol engine of the present invention;

DETAILED DESCRIPTION OF THE PREFERRED EMBODIMENTS

Figure 1:
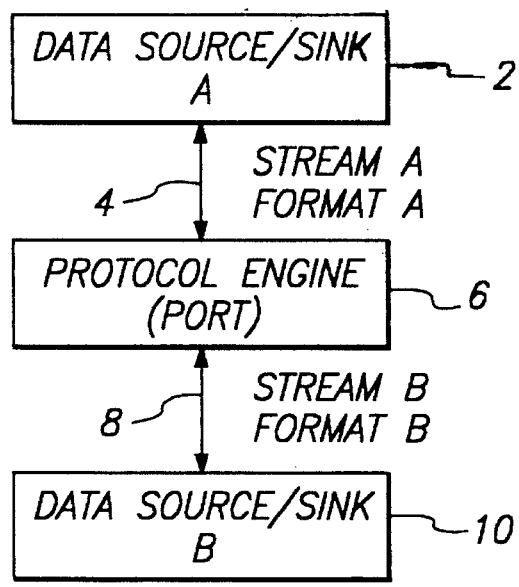
FIG. 1 is a block diagram of a system including a protocol engine of the present invention.

FIG. 1 depicts the relationship between a Protocol Engine and two data streams. Data Source/Sink A (2) is sending (or receiving) STREAM A (4). The Protocol Engine (6) passes the information in STREAM A (4) to (or from) STREAM B (8) and Data Source/Sink B (10). If STREAM A (4) and STREAM B (8) have the same message format, then the purpose of the Protocol Engine (6) is only to move data.

The more significant case is when STREAM A (4) and STREAM B (6) have different message formats. In this case the protocol engine (6) must modify the data stream as it passes through the protocol engine (6). Practical examples include, but are not limited to, the following: (1) STEAM A (4) includes Transmission Control Protocol/Internetwork Protocol (TCP/IP)data messages embedded in fiber optic network Fiber Distributed Data Interface (FDDI) frames, STREAM B (8) is application data in a computer memory; (2) STREAM A (4) is Transmission Control Protocol Internetwork Protocol (TCP/IP) embedded in Fiber Distributed Data Interface (FDDI) frees, STREAM B (8) is TCP/IP embedded in ethernet frames; or (3) STREAM A (4) is Network File System (NFS) Remote Procedure Call (RPC) packets, STREAM B (8) comprises of file system records and control structures in a computer memory.

A preferred Protocol Engine (6) embodiment comprises stream processing modules called PORTs. FIG. 2 depicts the structure of a PORT (20) which contains an on-board dedicated datapath for connecting two separate data streams (22), a controlling cpu, (24), and stream processing units (26). The data stream paths (D 1 (32), D2 (36), D3 (38), and D4 (34)) and the instruction (28) and memory (30) datapaths (D7 (28) and D8 (30)) for the controlling cpu (24) are separated to maximize bandwidth and minimize interference between the different kinds of traffic that appear on the principal external buses (D 1 (32), D4 (34), D7 (28), and D8 (30)).

The control functions for the datapath and stream processing units (26) are integrated into the cpu (24) architecture. This results in extensions and specializations of a traditional cpu architecture (based on load, store, test, branch, arithmetic, and logical instructions) to encompass real-time data stream and protocol processing functions in the instruction set architecture (see discussion of FIGS. 9, and 10).

The PORT architecture shown in FIG. 2 comprises an on-board datapath (22) connecting the data source/sink A (2) with the data source/sink B (10). This datapath (22) comprises the individual datapaths D 1 (32), D2 (36), D3 (38), and D4 34. Bus controller 1 (44) is specialized to the format and data transfer conventions of data source/sink A (2) and serves to move data between data source/sink A (2) and internal bus D2 (36). Bus controller 2 (46) serves the same purpose between internal bus D3 (38) and bus D4 (34). Buses D2 (36) and D3 (38) connect the STREAM PROCESSING UNITS (26) to the Data sources and sinks A (2) and B (10). The STEAM PROCESSING UNITS (26) are specialized to carry out the conversion functions required by the system. Methods and Apparatus for STREAM PROCESSING UNITS are described in later paragraphs (see FIG. 3).

The STREAM PROCESSING UNITS (26) and Bus Controllers 1 (44) and 2 (46) contain circuitry for interfacing to the cpu (24). This circuitry is represented in FIG. 2 by C1 (48) and E1 (50). C1 (48) represents the control path from the cpu (24) to the stream processing units (26) and bus controllers (44 and 46). C1 (48) is implemented by the Special Purpose Registers (SPRs) (212 in FIG. 9) in the cpu (24). E1 (50) represents the path whereby the bus controllers (44 and 46) and stream processing units (26) return results and status indications to the cpu (24). E1 (50) is implemented both by the SPRs (212 in FIG. 9) and the EVENT REGISTER (300) (see FIG. 10). D5 (52) and D6 (54) represent datapaths to working storage (56) (DATA MEMORY) through the memory controller (58) and bus D8 (30). Bus D7 (28) represents the path to program instruction memory (60) utilized by the cpu (24).

The preferred embodiment of a PORT (20) includes all of the devices depicted within the rectangle V (20) and may be constructed as a single VLSI circuit. This is not required to implement the architecture: it is possible to separate the cpu (24) function and other functions into separate VLSI components. It is also expected that future VLSI technologies permit multiple PORTs on a single VLSI circuit. It is also possible to implement some or all of the DATA MEMORY (56) and INSTRUCTION MEMORY (60) on the VLSI circuit.

Figure 3:
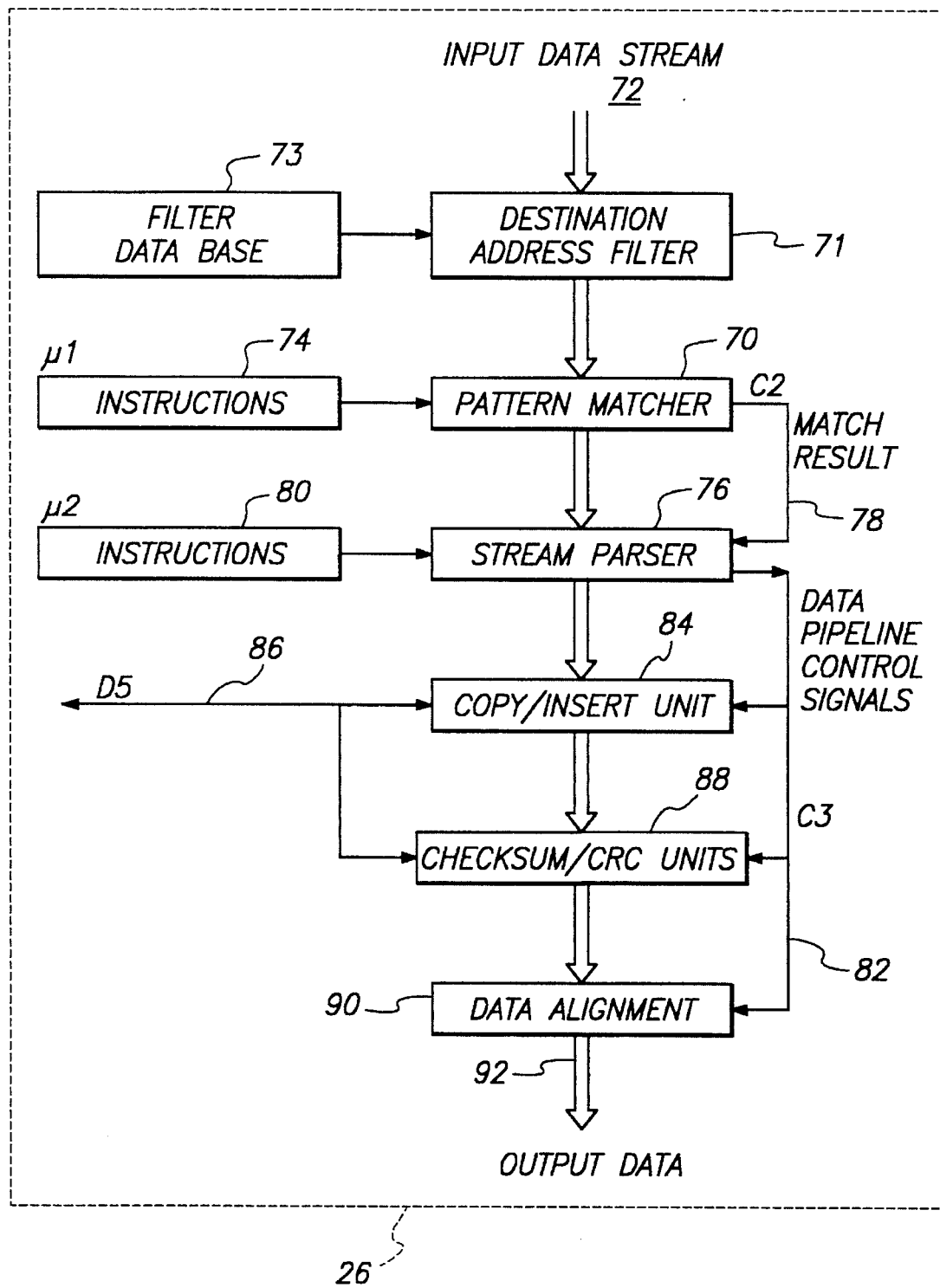
FIG. 3 is a block diagram of a preferred embodiment of a pipeline of stream processing units of the protocol engine of the present invention for a unidirectional stream.

Referring now to FIG. 3, a pipeline of stream processing units for a unidirectional stream is shown. Bidirectional streams can be implemented by adding a second pipeline (not shown) like that of FIG. 3. Conventional designs, particularly Media Access Control (MAC) chips for IPI-2, IPI-3, SCSI, ethernet, FDDI, Sonet and other media, employ fixed pattern matches and/or a fixed stream parser. The Protocol Engine employs a novel programmable facility for both functions.

In the stream pipeline architecture the stream processing units (26) operate concurrently on data as it passes through them. If each unit can perform its task at the rate of the input data stream (32) then the entire pipeline (26) composed of the individual units imposes no bandwidth degradation of the input data stream (32). When compared to the sequential order of execution that would be imposed if a general purpose processor were used to perform the functions of the stream processing units (26), the latency imposed by the pipeline approach is much lower because of the overlapping parallel execution.

The stream processing units (70, 71, 76, 84, 88, 90) depicted in FIG. 3 are appropriate to the processing of network protocols for bridge/router applications and for host interface applications. Processing units for additional functions or other application such as data compression or encryption or other data transformations could be added as additional pipeline units.

Although the notion of a pipeline processing architecture is not new, the kinds of data stream processing functions depicted in FIG. 3 represent a novel architecture when applied to protocol processing, and when combined in a pipeline, and when they are tightly coupled to a controlling cpu (24) as shown in FIG. 2.

The Destination Address Filter (71) contains apparatus for locating an entry in a filter data base (73) corresponding to the destination address in the input stream and for making a filter decision and performing additional processing based upon the contents of the filter data base entry. Other processing can include but is not limited to collecting traffic statistics and transferring filter data base information to other system components. The fifo effect of the numerous stream processing units (70, 76, 84, 88, 90) provides sufficient depth to make a decision to forward or not forward an incoming packet before data from that packet has passed to the output datapath (92).

The PATTERN MATCHER (70) performs a scanning function on every incoming byte of the input data stream (72) and provides notification of the results of the scanning process to other components in the pipeline. The PATTERN MATCHER (70) continuously scans the input stream to locate and identify sequences of bits, bytes, words, or longer sequences of bits, bytes, or words that match patterns stored in its instruction memory (74). The actual encoding of the patterns in instruction memory (74) depends on the technique chosen for building the pattern matching apparatus. There are numerous techniques that may be used for this purpose. Some of these include using finite state machines, or content-addressable memories, or programming a general purpose cpu.

Figures 5, 13:
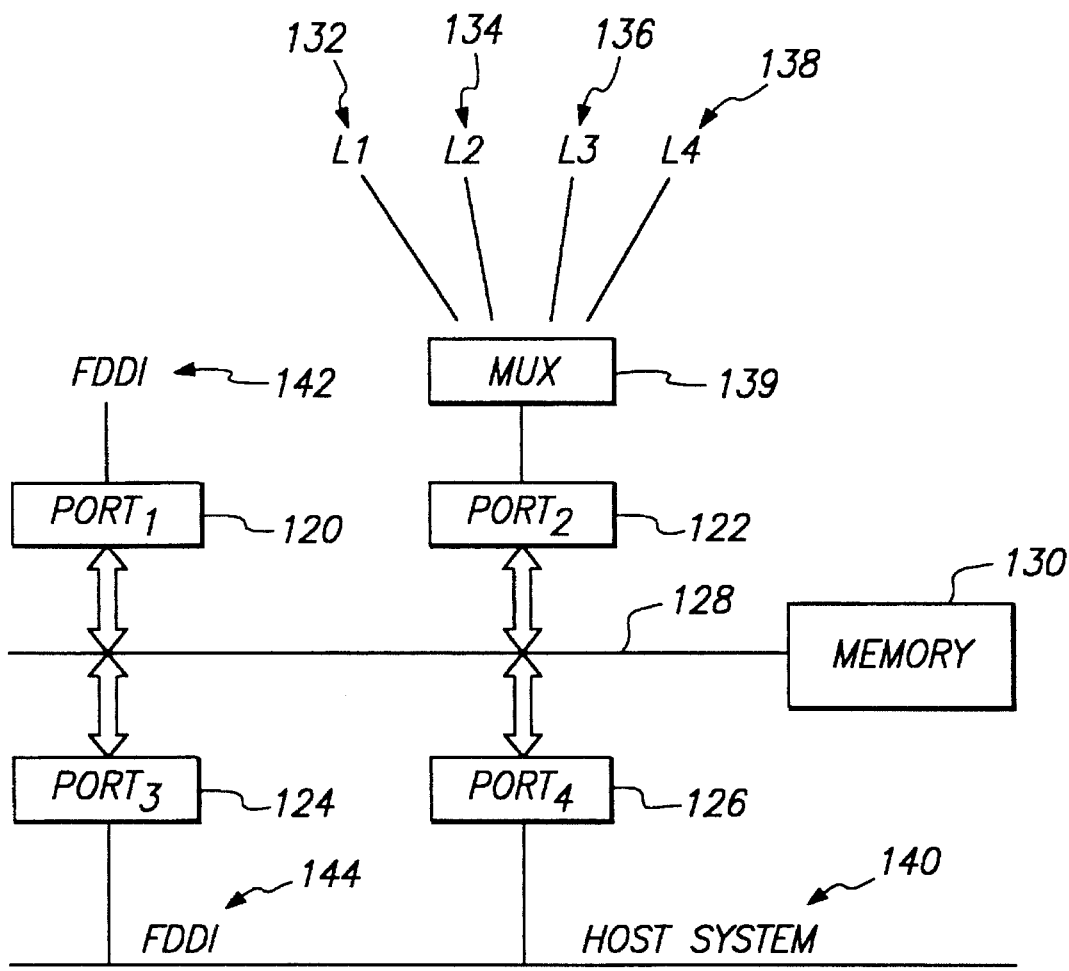
FIG. 5 is a second embodiment of the protocol engines in a computer system.
FIG. 13 is an example of several data patterns.

In FIG. 3 the pattern match result is transferred to the STREAM PARSER (76). Note that the result could as well be broadcast to other units in addition to the STREAM PARSER (76) in variations of the pipeline design. FIG. 13 provides an example of several patterns. Pattern 1 matches anytime that a six-digit sequence is detected immediately following the start of a frame. The first and second digits must be '6' and '7' respectively. The third and fourth may be any digit, using the symbol 'X' to mean "don't care". The fifth and sixth digits must be '8' and '9' respectively. Pattern 2 matches any time that the third and fourth digits after the start of a frame are equal to '2' and '3'.

In this example with two patterns there would be three possible pattern match results: pattern 1, pattern 2, and the default pattern. Given a more complex situation with N different patterns, an N+1st default result is needed to indicate that none of the programmed patterns were found. In the Protocol Engine the patterns are usually defined as starting, or being "anchored", to the start of a packet or a frame. This is because the input data stream (72) is usually presented as a sequence of packets. This does not exclude the application of pattern matching to other types of data streams which may use a different type of encoding.

The important properties of the PATTERN MATCHER (70) in a Protocol Engine are that it is programmable for different patterns and can deliver results to other system components.

In a computer network where the input data stream (72) may contain several different kinds of protocol formats, the primary function of the PATTERN MATCHER (70) is to determine which protocol format is currently being delivered in the input data stream (72). The STREAM PARSER (76) is notified when the format has been identified. This notification is used by the STREAM PARSER (76) to select a particular program for further processing of the stream. The choice of programming method and apparatus for a STEAM PARSER (76) depend on the nature and complexity of the formats expected in the input data stream (72). It is sufficient to state that the STEAM PARSER (76) apparatus may be a general purpose cpu.

The instruction memory (80) for the STREAM PARSER (76) contains several different program sequences, in general one for each different pattern match result that might be received from the PATTERN MATCHER (70). This would include a program for the default pattern. Whenever a match result is presented to the STREAM PARSER (76), it executes the selected program and performs the desired operations on the data stream. The functions of a STREAM PARSER (76) program are to parse control information in the data stream and, after processing the control information, to give commands to other system components such as the COPY/INSERT UNIT (84), CHECKSUM/CRC UNITS (88), and DATA ALIGNMENT unit (90). These commands tell the other units when to operate on segments of the data stream, when to skip segments of the data stream, and in general when to perform their particular function.

For example in a network protocol that includes checksumming, the checksum function is typically not computed on all the bytes of the data stream. Instead the checksum function is computed on a variable-length, embedded sequence of bytes in the stream: that is, the sequence of bytes to be checksummed may not appear at the same position in each packet and the number of bytes may also be different. Therefore the algorithm for locating the correct byte sequence (for checksumming) usually comprises performing arithmetic calculations on control information found in the data stream, where the exact algorithm is different for each different network protocol. The STREAM PARSER (76) performs this location function on behalf of other stream processing units such as the CHECKSUM/CRC UNIT (88). Thus all the stream processing units are able to share the programmable nature of the STREAM PARSER (76).

It is possible to combine the functions of PATTERN MATCHER (70) and STREAM PARSER (76) into a single apparatus. However there are advantages to keeping them separate. Algorithms for pattern matching and stream parsing are different enough that apparatus for performing these functions can be specialized for efficiency and speed. Consequently a highly optimized pattern matcher does not make a good stream parser, and vice versa. In addition there is another advantage in that some protocol formats necessitate performing pattern matching and stream parsing at the same time. In these cases the separation of function provides lower latency and the possibility of greater bandwidth.

The copy portion of the COPY/INSERT UNIT (84) creates a duplicate stream from segments of the input datastream (72) selected by the STREAM PARSER (76). The duplicate data is saved via datapath D5 (86) (the same D5 (52) in FIG. 2) for further processing by the cpu (24). The insert portion of the COPY/INSERT UNIT (84) inserts additional data, selected by the cpu (24) or generated by STREAM PROCESSING UNITS (26) into the data stream as it passes through the COPY/INSERT UNIT (84).

The CHECKSUM/CRC UNITS (88) calculate the selected checksum functions on the dam stream. Example checksums could include the 1's-add function defined for IP/TCP, the circulating 1's-add function defined for XNS, the Fletcher algorithm defined for OSI protocols, or the CRC function defined for Asynchronous Transfer Mode (ATM) headers.

The DATA ALIGNMENT (90) function adjusts the positioning of data bytes within the input data stream (72) as needed. For example, if the input data stream (72) contains a frame or packet with a segment having an odd number of bytes and the immediately following bytes must be wordaligned on the output datapath, then some extra padding bytes are added to the OUTPUT DATA STREAM (92) by the DATA ALIGNMENT (90) component.

Figure 4:
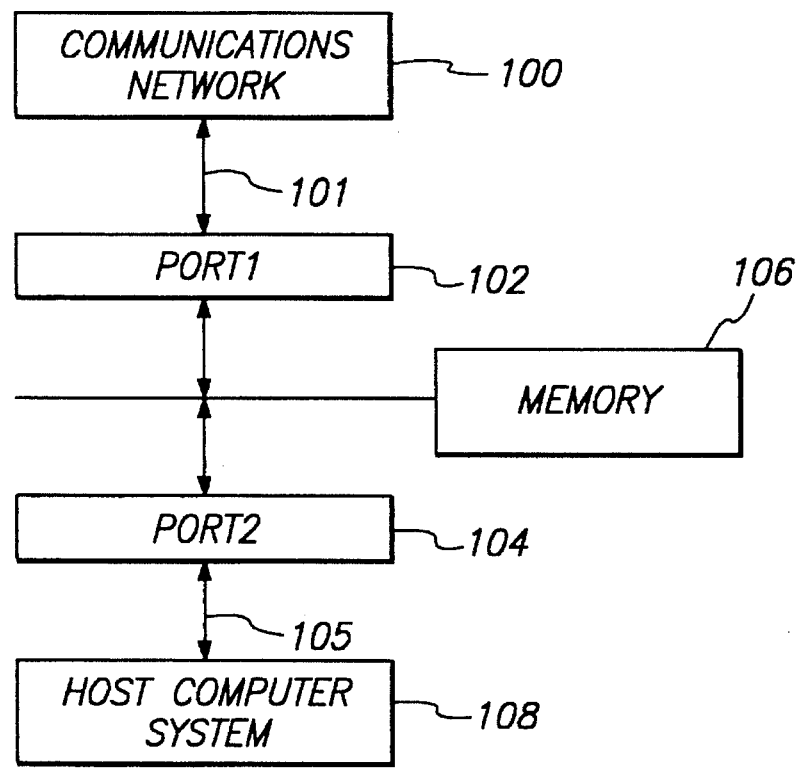
FIG. 4 is a first embodiment of the protocol engines in a computer system.

Referring now to FIG. 4, an example arrangement of two PORT chips (102 and 104) used to connect a COMMUNICATIONS NETWORK (100) to a HOST COMPUTER SYSTEM (108) is shown. Each PORT (100, 102) chip contains the cpu (24), datapaths (22), and STREAM PROCESSING units (26) described in FIGS. 2 and 3. Data moves between the PORT chips (102 and 104) and their respective data source or sink (100 and 108) over dedicated datapaths (101 and 105). A memory (106) is placed between the PORTs (102 and 104) and is accessible by them for the purpose of buffering the data streams between PORTs (102 and 104). This memory (106) is needed to manage possible disparities in data stream bandwidth or latency between the COMMUNICATIONS NETWORK (100) and the HOST COMPUTER SYSTEM (108).

FIG. 5 depicts an example arrangement of four PORTs (120, 122, 124, and 126) sharing a common bus (128) and memory (130). In this example, PORTs 120 and 124 connect to Fiber Distributed Data Interface (FDDI) networks. In this example, PORT 122 connects to multiple communication lines (132, 134, 136, and 138) via multiplexing logic (139) that can optionally be incorporated on a PORT chip if desired. In this example, PORT 126 connects to a host system (140).

FIG. 5 shows how PORTs can connect to operate in a bridge, router, or switch between multiple data sources or sinks. In this example, two FDDI networks (142 and 144) are shown connected to a HOST SYSTEM (140) along with four communication lines (132, 134, 136, 138), or possibly lower speed LANS, shown being multiplexed into a single PORT (122).

Figure 6:
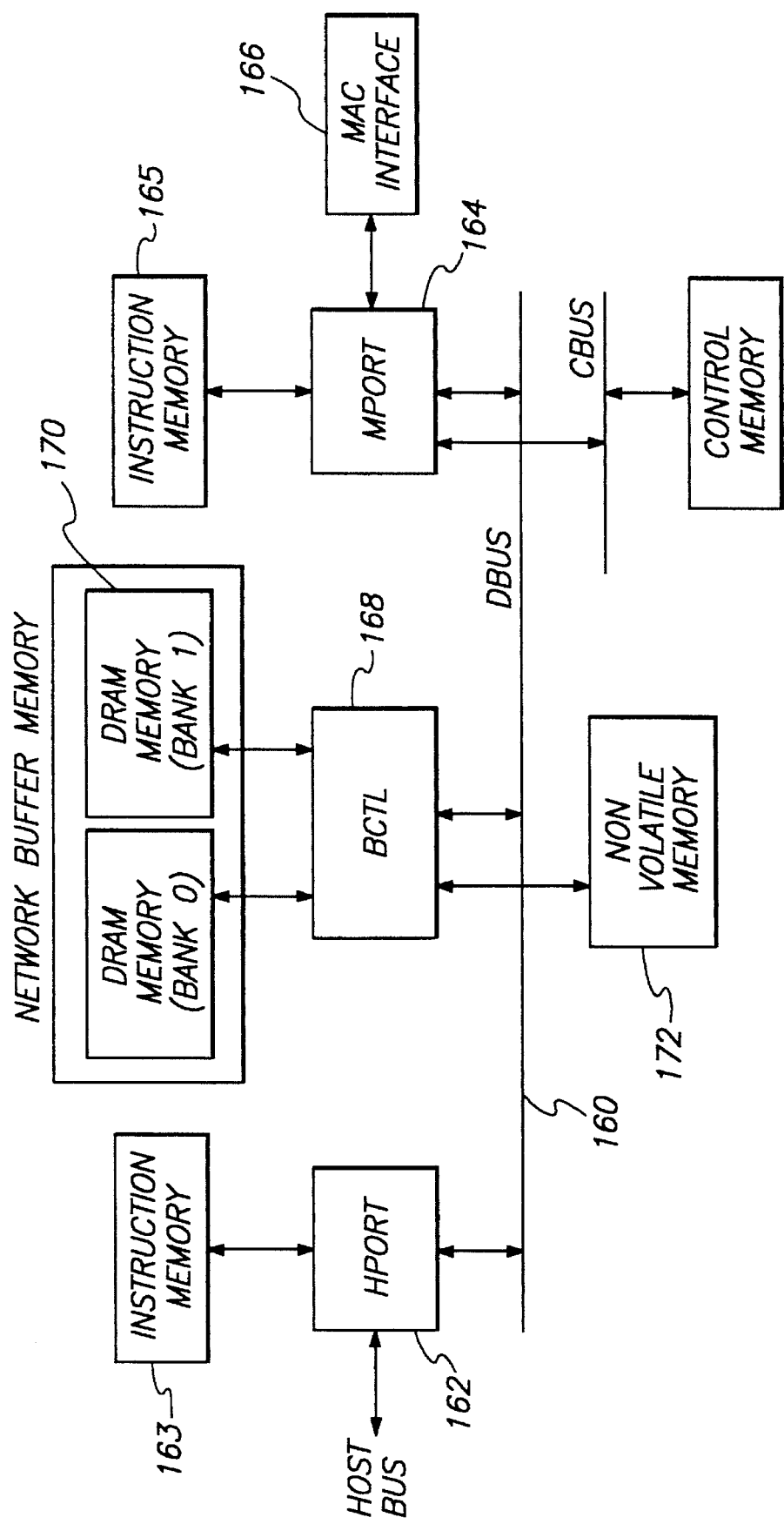
FIG. 6 is a preferred embodiment of an apparatus for controlling the data bus shared by protocol engines of the present invention.

FIG. 6 depicts an apparatus for controlling a data bus (160) shared between PORTs (162 and 164). Two PORTs (162 and 164) are shown: an HPORT (162) which connects to a Host Bus, and an MPORT (164) which connects to a MAC Interface (166). These two PORTs (162 and 164) share a data bus (DBus) (160). The DBus (160) is controlled by the Buffer Controller (BCTL) (168) which provides timing and control functions for the DBus (160) as well as memory control for DRAM memories (170).

The buffer control apparatus, or BCTL (168), is a VLSI circuit that provides timing and arbitration control for the DBus (160) which is shared by MPORT (164) and HPORT (162). The BCTL (168) also provides an interface to memory circuits to the DBus (160). The BCTL (168) is unique in that it supports two different kinds of memory: volatile DRAM (170) and non-volatile EEPROM memory (172).

BCTL (168) is also unique in that it contains apparatus for copying the encoded contents of the non-volatile memory (172) to DBus (160) locations accessible by it when the system power is turned on or when the system is given an initialization command. Example locations include the instruction memories (163, 165) of the PORT chips (162, 164) as well as configuration and control registers that may be similarly accessible.

Figure 11:
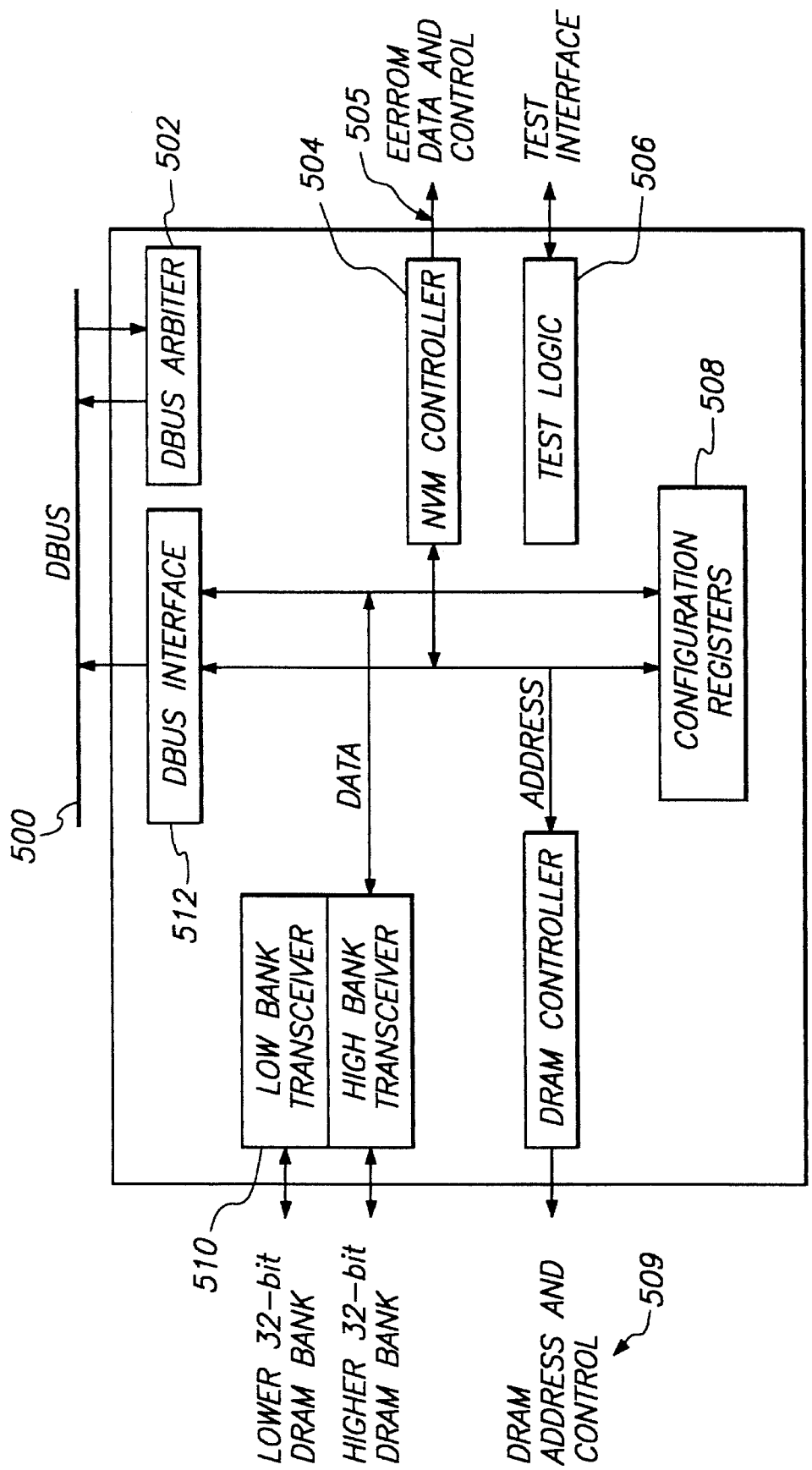
FIG. 11 is a block diagram of a preferred embodiment of the buffer controller of the present invention.

FIG. 11 provides a more detailed view of the BCTL apparatus. Transceiver circuits (510) for the dram interface and transceiver circuits located within the EEPROM interface (504) are designed to control the external memory circuits without a need for additional external circuitry. The DBus interface (512) provides a path to the DBus (500) for both the Dram interface (510) and the NVM interface (504).

When system-wide control signals (not shown) indicate that the system is to be initialized, the nonvolatile memory, NVM, controller (504) takes control of the DBus (500) and copies the encoded contents of the external EEPROM memory (172) to the instruction memories of PORT chips that are attached to the DBus (500).

Referring to FIG. 6, the instruction memories of the PORT chips (163, 165) in this example are accessible through dedicated addresses on the DBus (164). The appropriate addresses for these instruction memories are encoded within the Non-Volatile Memory (172) and direct the NVM controller (FIG. 11, 504) to move data to the correct locations. The DBus (500) data path is 32-bits wide in this embodiment of the design, and the EEPROM dampath (505) is only 8-bits wide.

The instruction memories (163 and 165) are 24-bits wide. Therefore the NVM controller (504) also serves to construct 32-bit wide or 24-bit wide words from the 8-bit wide EEPROM. The width decision is controlled by encoded values contained within the EEPROM which are interpreted by the NVM controller (504) when it performs the system initialization function.

The NVM controller (504) may also be used to write the contents of the EEPROM. This is accomplished by manipulating the configuration registers (508) from the DBus (500) and then sending properly encoded data to the DBus interface (5 12). This capability is useful for updating or modifying the EEPROM contents when the BCTL apparatus after a Protocol Engine system has been installed in the field.

Figure 7:
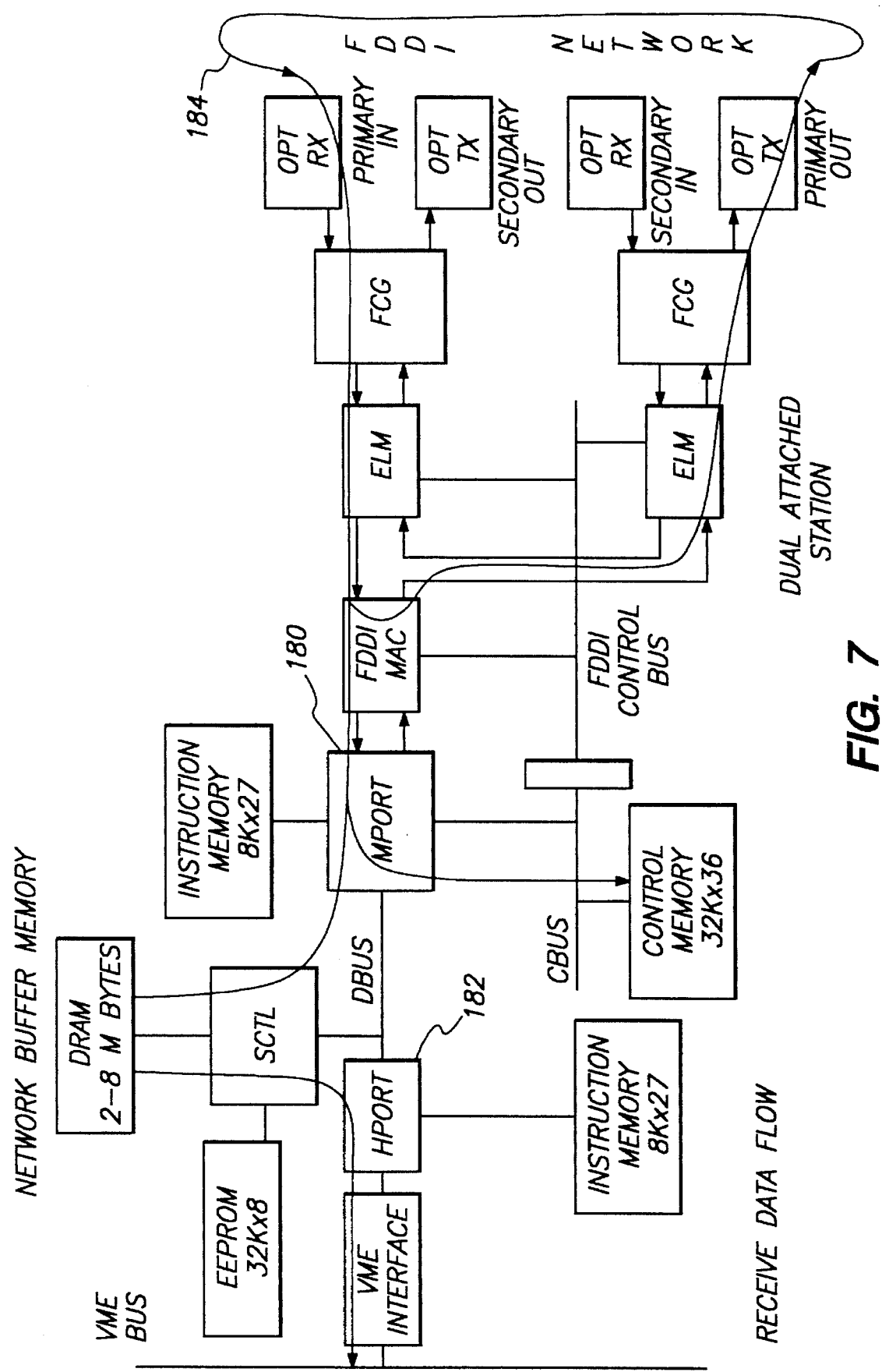
FIGS. 7 and 8 are data flow diagrams for the protocol engines and the PORT chips of FIGS. 4—6.

FIG. 7 depicts the flow of received data for an MPORT (180) and HPORT (182) combination of PORT chips used in an arrangement to attach an FDDI network to a host computer. Hardware state machines buffer incoming packets onto temporary lists in the Buffer Control (BCTL) network buffer memory (106). Simultaneously, the PATTERN MATCHER (70) recognizes the frame and the COPY/INSERT UNIT (84) extracts frame information for the PORT cpu (24). The PORT cpu (24) firmware residing in INSTRUCTION MEMORY (60) then either puts the received packet back on a Network Buffer Memory (106) freelist, appends it to a selected Network Buffer Memory (106) queue for the HPORT (182), or keeps it on a reassembly queue in Network Buffer Memory (106) until any missing pieces arrive or the reassembly process times out.

Figure 8:
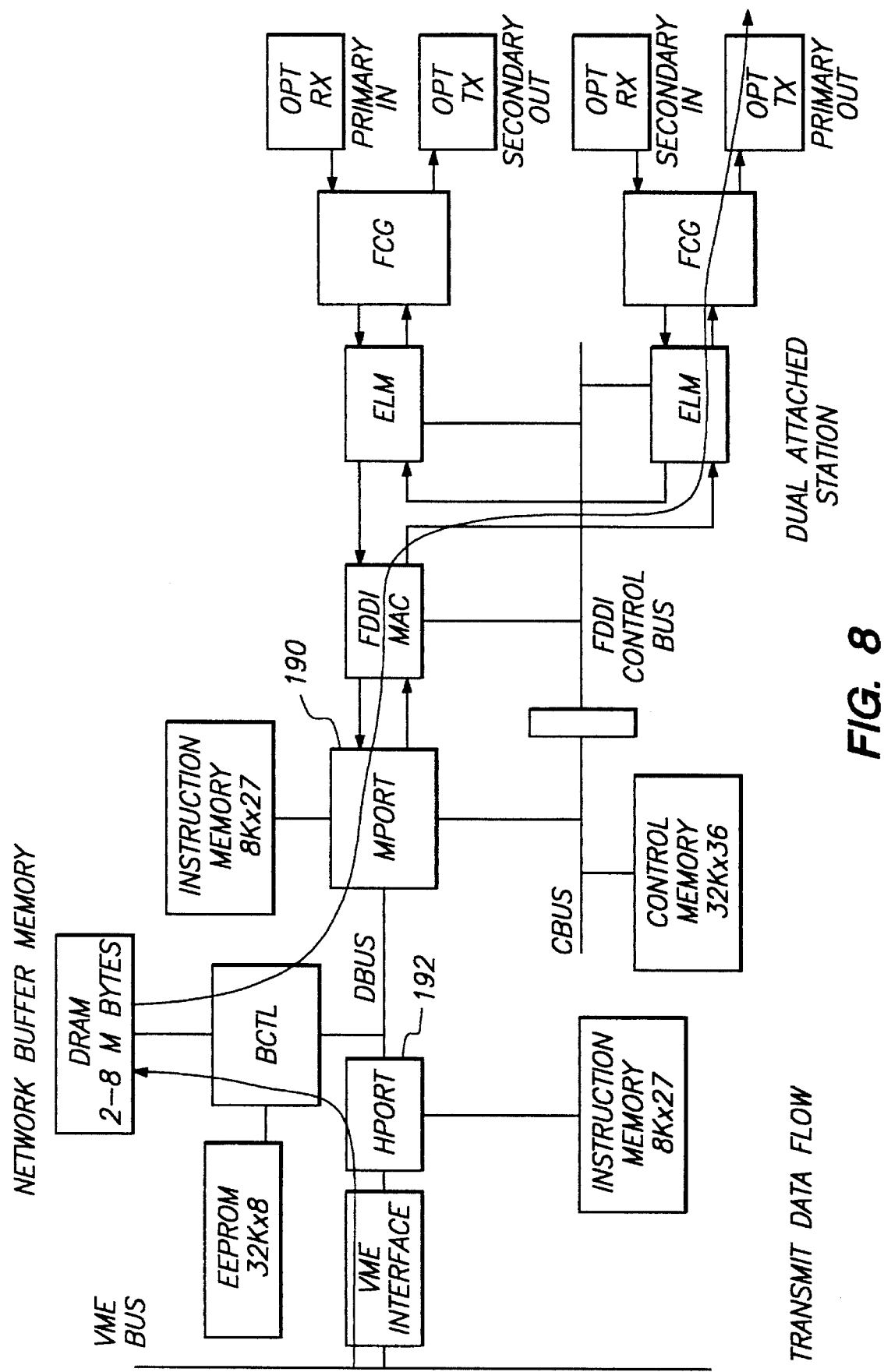

FIG. 8 depicts the flow of output data for an MPORT (190) and HPORT (192) combination of PORT chips used in an arrangement to attach an FDDI network to a host computer. The HPORT (192) reads commands and data from lists in host computer system (108) memory. As data moves across the HPORT (192), it is checksummed by the CHECKSUM/CRC UNIT (88) and attached to protocol headers that are generated as needed. Completed network frames are placed on the MPORT (190) output queues in Network Buffer Memory (106) for transmission.

Figure 9:
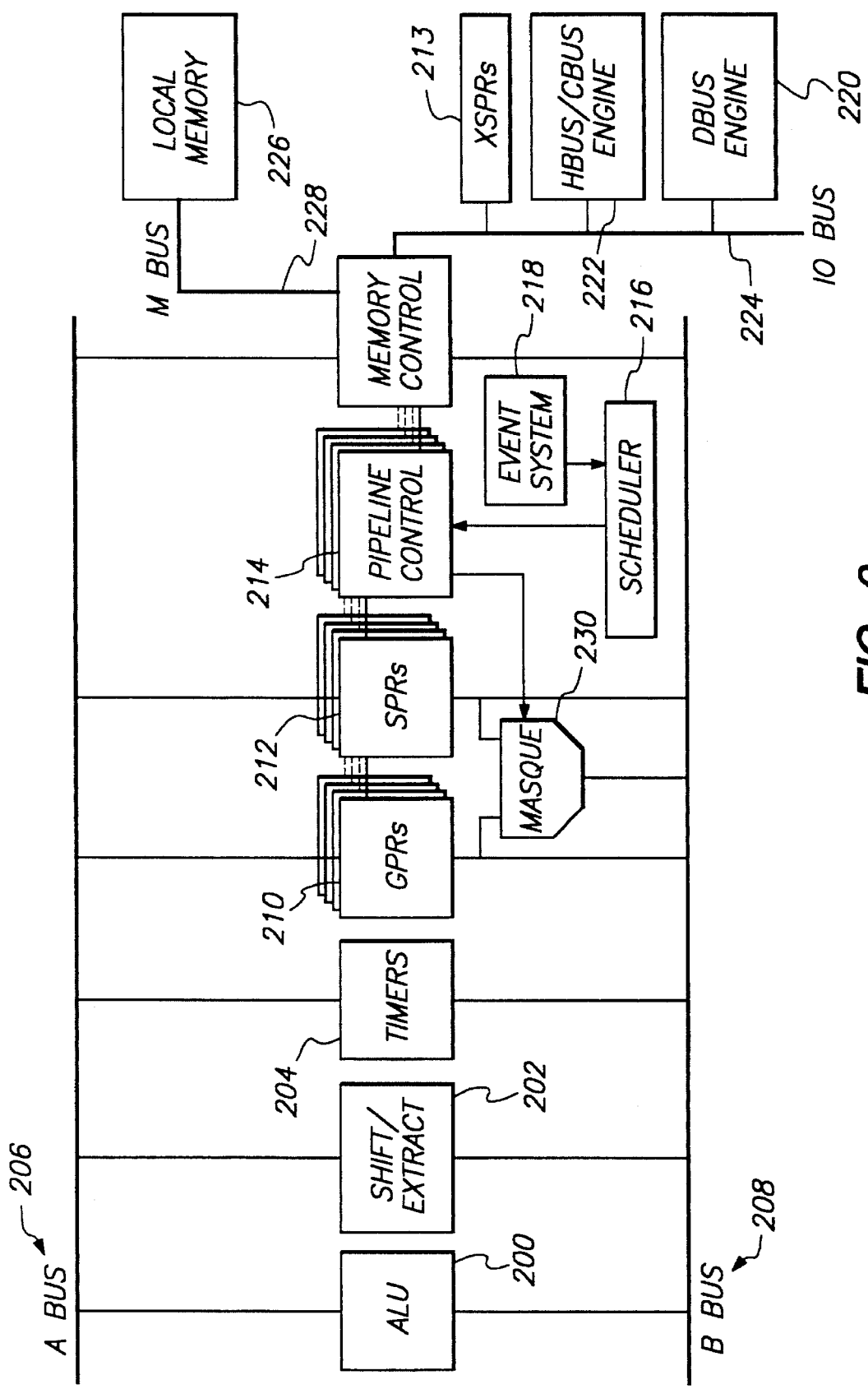
FIG. 9 is a block diagram of the central processing unit for the protocol engines of the present invention.

FIG. 9 depicts the principal datapaths of the Protocol Engine cpu (24) (or the PORT cpu (24)). The instruction fetch unit is not explicitly shown and may be considered pan of the Pipeline Control for this discussion. The Arithmetic Logic Unit (ALU) (200) and shift/extract blocks (202) are found in all digital execution units dating back to the earliest machines built in the late 1940's and 1950's. Timer units (204) are also commonly found in many systems, as are dual-rail buses such as the A Bus (206) and B Bus (208).

The cpu (24) design of the present invention is unique in the organization of its General Purpose Registers (GPRs) (210), Special Purpose Registers (SPRs) (212), external SPRs (XSPRs) (213), Pipeline Control (214), Scheduler (216), Event system (218), and control of its various external bus engines (DBus engine (220) and HBus/CBus Engine(222)) by the XSPRs (213) and the Pipeline Control (214).

Most execution units contain a set of GPRs (210). There have been exceptions such as the TI-9000 series and the General Electric 400-series machines both of which used main memory instead of dedicated cpu registers. Most cpus also define some special registers (SPRs) (212 and 213) that relate to internal workings of the cpu. Examples include interrupt control and mask registers, cpu status and mode registers, memory map, cache control, and Translation Look Aside (TLB) control registers. The Program Counter (PC) and Stack Pointer (SP) are SPRs in some designs and GPRs in others.

In all cases, where SPRs are present, the cpu architecture defines two instruction sets. One set operates on the GPRs and includes "normal" instructions such as load and store and ALU operations. The other set of instructions are specialized and apply just to the SPRs. The most common examples are instructions for saving and restoring the cpu interrupt priority level.

The PORT cpu's (24) register set architecture differs in two ways. First, there are several complete sets of GPRs (210). Each GPR set, plus related state information, represents an execution environment called a THREAD. There are special facilities, described later, for switching between threads. Second, the PORT cpu (24) does not define a set of special instructions for its SPRs (212 and 213). Instead the SPRs 212 and 213) are referenced by the same load/store instructions that operate on the GPRs (210).

Also, many of the SPRs (212 and 213) are duplicated in the same way as the GPRs (210) so that each execution environment appears to own a private set of SPRs (212 and 213).

The PORT cpu (24) resources such as registers, timers, memories, and buses are shared between several competing entities: the multiple execution threads, plus the bus engines (220, and 222) located on the IO Bus (224), plus external events such as interrupts. These entities all compete for bandwidth into the Local Memory (226) via the Mbus (228) and into other cpu resources via the A Bus (206) and B Bus (208). The PORT cpu (24) system is synchronously clocked, and the Pipeline Control (214) decides from one clock tick to the next which contending entities is granted access to particular buses.

Pipeline Control

Pipeline Control uses specialized methods including low-latency thread switching, a method for scheduling threads, elimination of pipeline stalls or pipeline flushing, predictable branch delays, a forwarding method to eliminate delay slots after store instructions, and a method for efficiently scheduling the cpu buses. These are discussed in order in the following paragraphs.

Low-Latency Thread Switching

Since hardware facilities are provided for each thread, switching between threads can be accomplished in a single clock tick eliminating any need to save or restore registers.

Thread Scheduling

Figure 10:
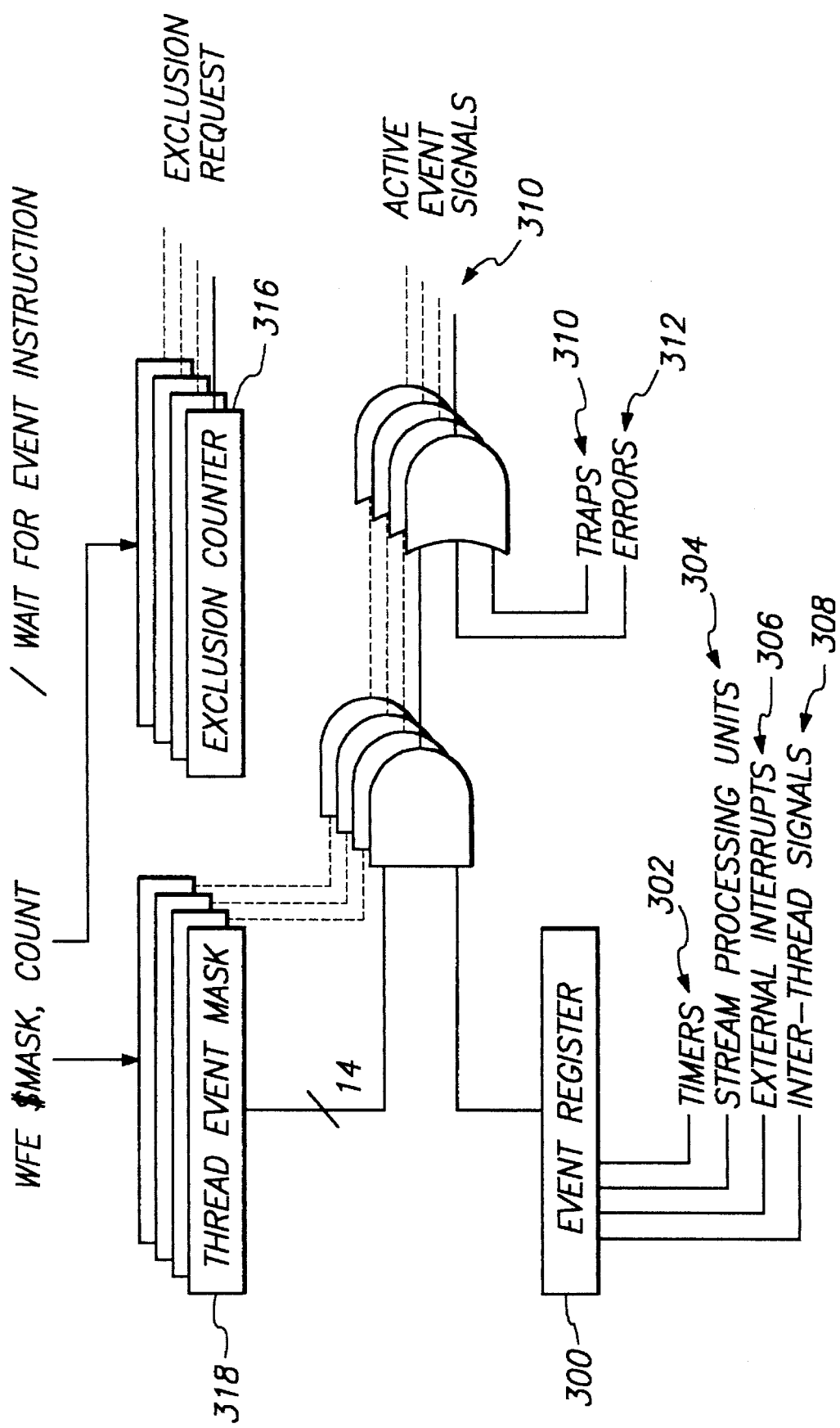
FIG. 10 is a block schematic diagram of the event sampling apparatus and the Exclusion Counter used by in the Wait-For-Event instruction.

Various hardware EVENTs are sampled on each clock tick in an Event register (300) shown in FIG. 10. These include the results of Timers (302), Stream Processing Units (304), External Interrupts (306), and Inter-Thread (thread-to-thread) signals (308). Any or all of these events can be masked selectively on a per-thread basis. In addition, there are traps (310) and error conditions (312) which cannot be masked. These conditions are evaluated during every clock cycle for each thread.

There is an ACTIVE EVENT signal (314) for each thread which may become activated by the continuous event evaluation process performed by apparatuses depicted in FIG. 10. All ACTIVE EVENT signals (314) are passed into the SCHEDULER (216) (refer to FIG. 9). The cpu SCHEDULER (216) provides either a round-robin policy or a strict priority policy to decide which thread is "next" when more than one thread has an active event. Obviously, other scheduling policies could be substituted for these if applicable. The next thread selection is fed into the pipeline control (214). The mechanism of continuously evaluating a thread's READY status provides for event sharing with response from the highest priority ready-to-run thread and avoids falsely invoking any lower priority ready-to-run thread.

Pipeline Stalls

Figure 12:
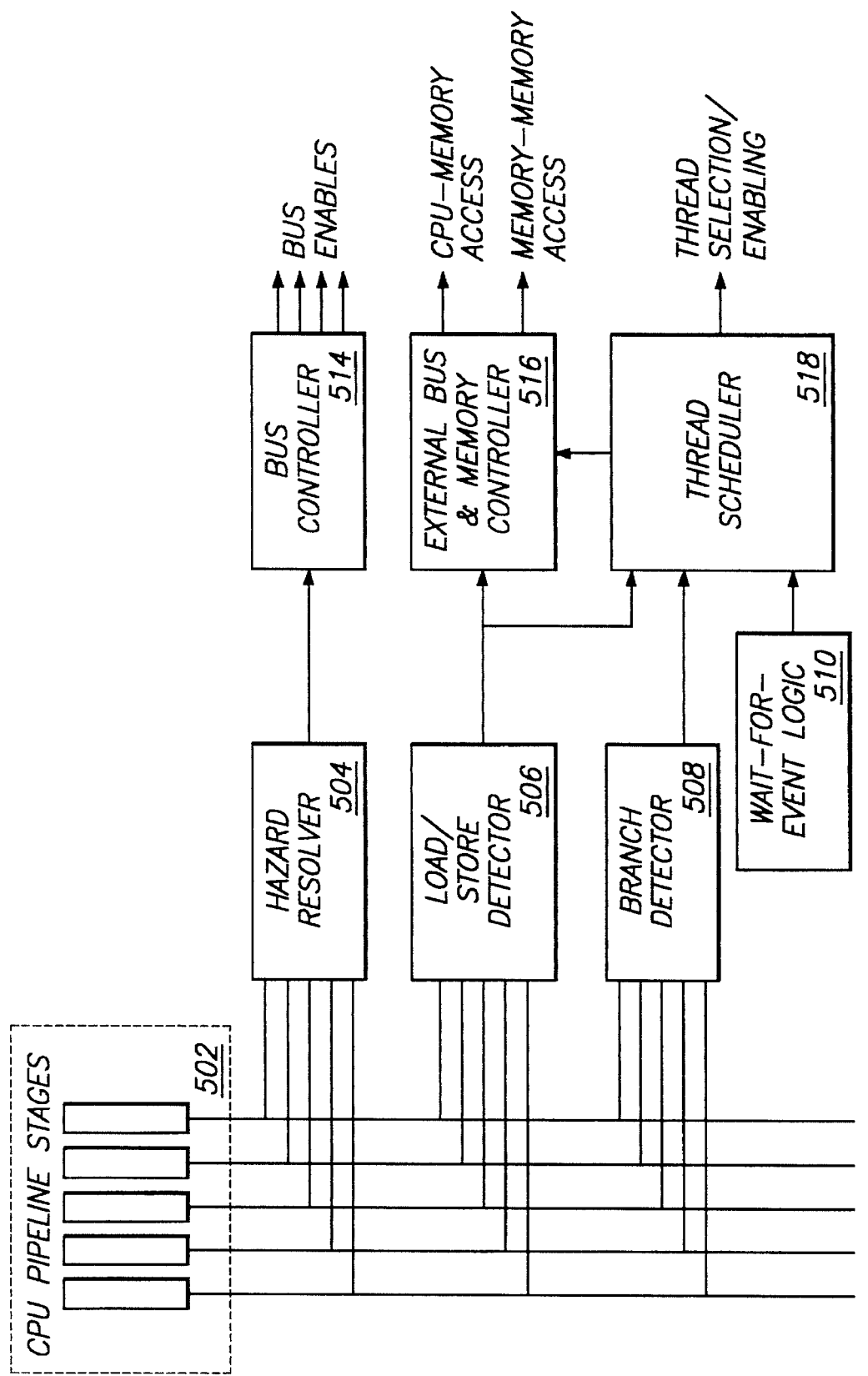
FIG. 12 is a block diagram of a preferred embodiment of the pipeline controller of the present invention.

The pipeline control (214) is shown in more detail in FIG. 12. The cpu pipeline registers (502) include enough state information to assist the Hazard Resolver (504), Branch Detector (508), and Wait-For-Event Detector (510). The Hazard Resolver (504) determines where to obtain valid data for each pipeline stage. The Load/Store Detector (506) determines when instructions are at appropriate stages of the pipeline to allow concurrent activity on the cpu (24) buses (206, 208, 224, and 228). The Branch Detector (508) determines when branches are at the appropriate pipeline stage to affect scheduling. The Wait-For-Event logic (510) is shown in FIG. 10.

The pipeline control (214) controls the activity on the cpu buses (206, 208,228, and 224) for each clock tick. The control method continuously records the state of the pipeline stages so that a thread switch does not require extra clock cycles to save state, e.g. does not cause a cpu pipeline stall. The External Bus and Memory Controller (516) allows concurrent activity into memories shared by the CPU and other components. The Load/Store detector (506), Branch Detector (508), and the Wait-For-Event logic (510) are input to the thread scheduler (518), which schedules threads on each clock tick. This minimizes the number of unused clock cycles and thereby maximizes the number of used, hence productive, cpu (24) clock cycles.

Branch Delays

The PORT cpu (24) imposes a single delay slot after a branch taken. The delay slot instruction can be a NOP or an executable instruction. The obvious pipeline control (214) would eliminate the delay slot if the branch were followed by a thread switch with some accompanying cpu (24) performance loss. The PORT cpu (24) Pipeline Control (214) ensures that the delay slot instruction executes even in the presence of thread switching, delivering greater performance.

Delay Slots after Stores

Conventional execution unit designs require one, and sometimes more, delay slots after Load, Store, and Branch instructions. The PORT cpu (24) pipeline contains so-called "forwarding logic" so that results from any pipeline stage can be made available as input to any other pipeline stage. With this facility ,the Pipeline Control (214) does not have to impose a delay slot after Store instructions, i.e. does not have to wait for the Store cycle to complete, because the data being stored is available to any pipe stage that needs it.

Efficiently Scheduling CPU Buses

FIG. 9 shows four buses (A Bus (206), B Bus (208), M Bus (228), and IO Bus (224)). Conventional architectures incorporate arbitration units to decide bus mastership at each clock cycle. This means that all entities may have to wait, or may be preempted by an arbitrator. The PORT cpu (24) uses a method that keeps the cpu running at full speed without stalling and still grants adequate bandwidth to other entities.

The method is based on the pipeline control (214) "looking ahead" in time to know when the cpu needs any of the buses and when the cpu would leave an available time slot, or "hole", in the bus schedule. The Pipeline Control (214) dedicates bus cycles to the cpu (24) whenever they are needed, so the cpu (24) never stalls and runs at maximum speed.

The Pipeline Control (214) dedicates bus cycles to the other entities whenever the cpu (24) leaves a hole. In the normal course of instruction execution them is a sufficient number of holes to supply bandwidth to the non-cpu entities. This means that the cpu (24) can be executing in one thread while at the same time moving data by means of one of the bus engines (220 and 222) into the same or a different general purpose register set (210), or other storage space such as local data memory (106) for example.

The PORT cpu (24) includes a facility called the MASQUERADE register (230) which permits one thread to access the GPRs (210) and SPRs (212 and. 213) of a different thread. This facility lets one thread to "masquerade" as another for a variety of purposes including, but not limited to, thread-to-thread communication, and interactive debugging.

The internal state of conventional VLSI chips cannot be determined accurately and easily from the state of their external chip pins. In the VLSI circuit implementation of the PORT cpu (24), the internal state of the pipeline control ( 214) is available on dedicated chip output pins. This provides sufficient information for an external device such as a programmable logic analyzer to determine the internal state of the cpu. This approach is not available with conventional cpus designed with current art approaches. Therefore, these cpus require costly In Circuit Emulators (ICE) devices to provide equivalent visibility of their internal states. Obviously, other cpu information could be made available on external chip pins.

FIG. 10 depicts two facilities, the event register (300) and the Exclusion Counter (316), and their relationship to the Wait-For-Event cpu (24) instruction. The event register(300) was described earlier. The Exclusion Counter (316), when non-zero, is decremented by 1 for each instruction executed. During this time period thread switching is prohibited. This technique allows a thread to execute continuously for a programmable and uninterrupted number of instructions. This kind of facility is essential for correct operation and synchronization in a multi-thread environment within so-called "critical sections" of instruction sequences.

FIG. 10 depicts how the cpu (24) Wait-For-Event instruction loads both the Thread Event Mask (318) and Exclusion Counter (316). Although both registers (316 and 318) can be accessible as SPRs (212 and 23), it is useful to combine access to both in a single instruction. If the MASK specified in the Wait-For-Event instruction is non-zero, then the Thread Event Mask (318) is loaded and the current thread is suspended by the Pipeline Control (214) until the selected event appears in the event register (300). If the COUNT specified in the Wait-For-Event instruction is non-zero, then the Exclusion Counter (316) becomes active as described-above. The MASK specified in the Wait-For-Event instruction can be set with a COUNT specified in the Wait-For-Event instruction also set to zero. The COUNT specified in the Wait-For-Event instruction can be set with a MASK that is zero. Or both MASKs specified in the Wait-For-Event instruction and COUNT specified in the Wait-For-Event instruction can be set at the same time. If both are set to non-zero values, then the active thread is suspended until the selected event happens and when the thread begins executing again, the Wait-For-Event count takes effect.

It should be understood to those skilled in the art that many modifications may be made to the present invention and that the preferred embodiments described above are provided only by way of example. Such modifications fall within the true spirit and scope of the present invention which is only limited by the claims.

What is claimed is:

1. A central processing unit CPU for processing data streams having a plurality of threads, the central processing unit comprising:

an arithmetic logic unit ALU coupled to a first and second bus;

a shift/extract block coupled to the first and second buses;

a timer unit coupled to the first and second buses;

a plurality of general purpose register sets for storing data, each of the sets, when associated with corresponding state information, being representative of one of the threads and being coupled to the first and second buses, such that each general purpose register set is dedicated to a particular thread, whether or not the particular thread is being executed;

a plurality of special purpose registers for storing data, each of the special purpose registers being coupled to the first and second buses;

a memory controller for controlling access to an external memory, the memory controller being coupled to an external bus and the first and second buses;

an events system for sampling hardware events and software events, for storing said hardware events and said software events as hardware events, and for associating one of the threads with at least one of the hardware events;

a scheduler, coupled to the events system, for determining which one of the threads has priority for use of the CPU;

a pipeline controller for controlling use of the ALU, the shift/extract block and timer and for selecting the general and special purpose registers used; the pipeline controller coupled to the ALU, the shift/extract block, the timer, the general and special purpose registers, scheduler and memory controller; and a masque register for storing data, for providing access to the general and special purpose registers and the second bus, and for providing access to the general and special purpose registers of other threads.

2. A central processing unit CPU for processing data streams having a plurality of threads, the central processing unit comprising:

an arithmetic logic unit ALU coupled to a first and second bus;

a shift/extract block coupled to the first and second buses;

a timer unit coupled to the first and second buses;

a plurality of general purpose register sets for storing data, each of the sets, when associated with corresponding state information, being representative of one of the threads and being coupled to the first and second buses, such that each general purpose register set is dedicated to a particular thread, whether or not the particular thread is being executed;

a plurality of special purpose registers for storing data, each of the special purpose registers being coupled to the first and second buses;

a memory controller for controlling access to an external memory, the memory controller being coupled to an external bus and the first and second buses;

an events system for sampling hardware events and software events, for storing said hardware events and said software events as hardware events, and for associating one of the threads with at least one of the hardware events;

a scheduler, coupled to the events system, for determining which one of the threads has priority for use of the CPU, the scheduler including a plurality of thread masks, a plurality of Wait-for-Events, and combinational logic coupled to both the thread events masks and the events system for producing active signals used to schedule use of the CPU by different threads;

a pipeline controller for controlling use of the ALU, the shift/extract block and timer and for selecting the general and special purpose registers used; the pipeline controller being coupled to the ALU, the shift/extraclm block, the timer, the general and special purpose registers, scheduler and memory controller; and a masque register for storing data, for providing access to the general and special purpose registers and the second bus, and for providing access to the general and special purpose registers of other threads.

3. A central processing unit CPU for processing data streams having a plurality of threads, the central processing unit comprising:

a shift/extract block coupled to the first and second buses;

a timer unit coupled to the first and second buses;

a plurality of general purpose register sets for storing data, each of the sets, when associated with corresponding state information, being representative of one of the threads and being coupled to the first and second buses, such that each general purpose register set is dedicated to a particular thread, whether or not the particular thread is being executed;

a plurality of special purpose registers for storing data, each of the special purpose registers being coupled to the first and second buses;

a memory controller for controlling access to an external memory, the memory controller being coupled to an external bus and the first and second buses;

an events system for sampling hardware events and software events, for storing said hardware events and said software events as hardware events, and for associating one of the threads with at least one of the hardware events;

a scheduler, coupled to the events system, for determining which one of the threads has priority for use of the CPU;

a pipeline controller, coupled to the ALU, the shift/extract block, the timer, the general and special purpose registers, the scheduler and the memory controller, for controlling use of the ALU, the shift/extract block and timer, for selecting the general and special purpose registers used, and for switching between threads by switching between sets of general and special purpose registers; and a masque register for storing data, for providing access to the general and special purpose registers and the second bus, and for providing access to the general and special purpose registers of other threads.

4. A central processing unit CPU for processing data streams having a plurality of threads, the central processing unit comprising:

an arithmetic logic unit ALU coupled to a first and second bus;

a shift/extract block coupled to the first and second buses;

a timer unit coupled to the first and second buses;

a plurality of general purpose register sets for storing data, each of the sets, when associated with corresponding state information, being representative of one of the threads and being coupled to the first and second buses, such that each general purpose register set is dedicated to a particular thread, whether or not the particular thread is being executed;

a plurality of special purpose registers for storing data, each of the special purpose registers being coupled to the first and second buses;

a memory controller for controlling access to an external memory, the memory controller being coupled to an external bus and the first and second buses;

an events system for sampling hardware events and software events, for storing said hardware events and said software events as hardware events, and for associating one of the threads with at least one of the hardware events;

a scheduler, coupled to the events system, for determining which one of the threads has priority for use of the CPU;

a pipeline controller, coupled to the ALU, the shift/extract block, the timer, the general and special purpose registers, the scheduler and the memory controller, for controlling use of the ALU, the shift/extract block and timer, for selecting the general and special purpose registers used, and for processing branch instructions that include a single delay slot in which an executable instruction is performed; and a masque register for storing data, for providing access to the general and special purpose registers and the second bus, and for providing access to the general and special purpose registers of other threads.

5. A central processing unit CPU for processing data streams having a plurality of threads, the central processing unit comprising:

an arithmetic logic unit ALU coupled to a first and second bus;

a shift/extract block coupled to the first and second buses;

a timer unit coupled to the first and second buses;

a plurality of general purpose register sets for storing data, each of the sets, when associated with corresponding state information, being representative of one of the threads and being coupled to the first and second buses, such that each general purpose register set is dedicated to a particular thread, whether or not the particular thread is being executed;

a plurality of special purpose registers for storing data, each of the special purpose registers being coupled to the first and second buses;

a memory controller for controlling access to an external memory, the memory controller coupled to an external bus and the first and second buses;

an events system for sampling hardware events and software events, for storing said hardware events and said software events as hardware events, and for associating one of the threads with at least one of the hardware events;

a scheduler, coupled to the events system, for determining which one of the threads has priority for use of the CPU;

a pipeline controller, coupled to the ALU, the shift/extract block, the timer, the general and special purpose registers, the scheduler and the memory controller, for controlling use of the ALU, the shift/extract block and timer, for selecting the general and special purpose registers used, and including forwarding logic for providing the output of any pipeline stage as the input to other pipeline stages and eliminating the need for delay slots after store instructions; and a masque register for storing data, for providing access to the general and special purpose registers and the second bus, and for providing access to the general and special purpose registers of other threads.

6. A central processing unit CPU for processing the data streams having a plurality of threads, the central processing unit comprising:

an arithmetic logic unit ALU coupled to a first and second bus;

a shift/extract block coupled to the first and second buses;

a timer unit coupled to the first and second buses;

a plurality of general purpose register sets for storing data, each of the sets, when associated with corresponding state information, being representative of one of the threads and being coupled to the first and second buses, such that each general purpose register set is dedicated to a particular thread, whether or not the particular thread is being executed;

a plurality of special purpose registers for storing data, each of the special purpose registers being coupled to the first and second buses;

a memory controller for controlling access to an external memory, the memory controller being coupled to an external bus and the first and second buses;

an events system for sampling hardware events and software events, for storing said hardware events and said software events as hardware events, and for associating one of the threads with at least one of the hardware events;

a scheduler, coupled to the events system, for determining which one of the threads has priority for use of the CPU;

a pipeline controller, coupled to the ALU, the shift/extract block, the timer, the general and special purpose registers, the scheduler and the memory controller, for controlling use of the ALU, the shift/extract block and timer and for selecting the general and special purpose registers used, and for giving priority to the CPU to access the first and second buses as needed and for allocating the times when the CPU does not use the first and second buses to external devices; and a masque register for storing data, for providing access to the general and special purpose registers and the second bus, and for providing access to the general and special purpose registers of other threads.

7. A central processing unit CPU for processing data streams having a plurality of threads, the central processing unit comprising:

an arithmetic logic unit ALU coupled to a first and second bus;

a shift/extract block coupled to the first and second buses;

a timer unit coupled to the first and second buses;

a plurality of general purpose register sets for storing data, each of the sets, when associated with corresponding state information, being representative of one of the threads and being coupled to the first and second buses, such that each general purpose register set is dedicated to a particular thread, whether or not the particular thread is being executed;

a plurality of special purpose registers for storing data, each of the special purpose registers being coupled to the first and second buses;

a memory controller for controlling access to an external memory, the memory controller being coupled to an external bus and the first and second buses;

an events system for sampling hardware events and software events, for storing said hardware events and said software events as hardware events, and for associating one of the threads with at least one of the hardware events;

a scheduler, coupled to the events system, for determining which one of the threads has priority for use of the CPU; and a pipeline controller, coupled to the ALU, the shift/extract block, the timer, the general and special purpose registers, the scheduler and the memory controller, for controlling use of the ALU, the shift/extract block and timer, and for selecting the general and special purpose registers used; and a masque register for storing data, for providing access to the general and special purpose registers and the second bus, and for providing access to the general and special purpose registers of other threads.

8. A central processing unit CPU for processing data streams having a plurality of threads, the central processing unit comprising:

an arithmetic logic unit ALU coupled to a first and second bus;

a shift/extract block coupled to the first and second buses;

a timer unit coupled to the first and second buses;

a plurality of general purpose register sets for storing data, each of the sets, when associated with corresponding state information, being representative of one of the threads and being coupled to the first and second buses, such that each general purpose register set is dedicated to a particular thread, whether or not the particular thread is being executed;

a plurality of special purpose registers for storing data, each of the special purpose registers being coupled to the first and second buses;

a memory controller for controlling access to an external memory, the memory controller being coupled to an external bus and the first and second buses;

an events system for sampling hardware events and software events, for storing said hardware events and said software events as hardware events, and for associating one of the threads with at least one of the hardware events;

a scheduler, coupled to the events system, for determining which one of the threads has priority for use of the CPU;

a pipeline controller, coupled to the ALU, the shift/extract block, the timer, the general and special purpose registers, the scheduler and the memory controller, for controlling use of the ALU, the shift/extract block and timer, for selecting the general and special purpose registers used, and the VLSI chip providing dedicated output pins for the internal state of the pipeline controller; and a masque register for storing data, for providing access to the general and special purpose registers and the second bus, and for providing access to the general and special purpose registers of other threads.

* * * * *